US 11,521,791 B2

(12) United States Patent
Onuma et al.

(10) Patent No.: US 11,521,791 B2
(45) Date of Patent: Dec. 6, 2022

(54) COIL COMPONENT

(71) Applicant: TDK CORPORATION, Tokyo (JP)

(72) Inventors: Kenei Onuma, Tokyo (JP); Masazumi Arata, Tokyo (JP); Hitoshi Ohkubo, Tokyo (JP)

(73) Assignee: TDK CORPORATION, Tokyo (JP)

( * ) Notice: Subject to any disclaimer, the term of this patent is extended or adjusted under 35 U.S.C. 154(b) by 336 days.

(21) Appl. No.: 16/877,831

(22) Filed: May 19, 2020

(65) Prior Publication Data

US 2020/0373077 A1 Nov. 26, 2020

(30) Foreign Application Priority Data

May 21, 2019 (JP) .............................. JP2019-095126

(51) Int. Cl.
*H01F 27/32* (2006.01)
*H01F 27/28* (2006.01)

(52) U.S. Cl.
CPC ....... *H01F 27/323* (2013.01); *H01F 27/2871* (2013.01); *H01F 27/2885* (2013.01)

(58) Field of Classification Search
CPC ............... H01F 27/323; H01F 27/2871; H01F 27/2885; H01F 1/28; H01F 2017/048; H01F 17/04; H01F 27/292; H01F 17/0013; H01F 2003/106; H01F 27/324; H01F 27/327
See application file for complete search history.

(56) References Cited

U.S. PATENT DOCUMENTS

2016/0293316 A1   10/2016  Park et al.
2017/0006706 A1*   1/2017  Yoon ....................... H05K 1/181

FOREIGN PATENT DOCUMENTS

CN   108292555 A   *  7/2018  ............. H01F 1/057
JP   2006278484 A   * 10/2006
JP   2016-195245 A    11/2016

* cited by examiner

*Primary Examiner* — Tuyen T Nguyen
(74) *Attorney, Agent, or Firm* — Oliff PLC (57) ABSTRACT

An upper end portion and a lower end portion of a second magnetic portion of a coil component are further away from a coil than when a third part and a fifth part are not present. For this reason, a magnetic flux is unlikely to be concentrated in the upper end portion and the lower end portion of the second magnetic portion, so that magnetic saturation is unlikely to occur. Therefore, improvement of direct current superimposition characteristics is realized in the coil component.

6 Claims, 6 Drawing Sheets

COIL COMPONENT

CROSS-REFERENCE TO RELATED APPLICATIONS

This application is based upon and claims the benefit of priority from Japanese Patent Application No. 2019-95126, filed on 21 May 2019, the entire contents of which are incorporated herein by reference.

TECHNICAL FIELD

The present disclosure relates to a coil component.

BACKGROUND

Regarding a coil component in the related art, for example, Japanese Unexamined Patent Publication No. 2016-195245 discloses a coil component including a coil portion, a metal magnetic plate that is disposed in a core portion, a magnetic body that covers the coil portion and the metal magnetic plate, and an external electrode that is provided on a side surface of the magnetic body and is electrically connected to the coil portion. The coil portion in this literature has a configuration provided with a coil pattern which is subjected to insulation coating on each of both surfaces of an insulation substrate. According to the coil component of this literature, a metal magnetic plate having high magnetic permeability causes a magnetic flux to flow smoothly, and an inductance is increased.

SUMMARY

In a coil component according to the technology in the related art described above, a metal magnetic plate is closer to a coil portion at an end portion in a thickness direction of a substrate. Therefore, magnetic saturation occurs due to a magnetic flux concentrated at this place, and thus deterioration of direct current superimposition characteristics may be caused.

According to the present disclosure, a coil component having improved direct current superimposition characteristics is provided.

According to an aspect of the present disclosure, there is provided a coil component including an insulation substrate provided with a penetration hole, a coil having a first coil portion subjected to insulation coating with a first flat coil pattern formed around the penetration hole on one surface of the insulation substrate, a magnetic body integrally covering the insulation substrate and the coil, and a pair of external terminal electrodes provided on an outer surface of the magnetic body and respectively connected to end portions of the coil. The magnetic body has a first magnetic portion constituted of a metal magnetic powder-containing resin containing metal magnetic powders including Fe and covers the coil in at least a thickness direction of the insulation substrate, and a second magnetic portion extending in the thickness direction of the insulation substrate in an inward region of the coil and has a higher compositional proportion of Fe than the metal magnetic powder-containing resin constituting the first magnetic portion. The second magnetic portion has a first part present in the same layer as the insulation substrate, a second part present in the same layer as the first coil portion, and a third part present on a side further away from the insulation substrate than an upper surface position of the first coil portion.

In the coil component, the second magnetic portion of the magnetic body extending in the thickness direction of the insulation substrate in the inward region of the coil has a higher compositional proportion of Fe than the metal magnetic powder-containing resin constituting the first magnetic portion and has a high saturation magnetic flux density. In addition to the first part present in the same layer as the insulation substrate and the second part present in the same layer as the first coil portion, the second magnetic portion has the third part present on a side further away from the insulation substrate than the upper surface position of the first coil portion and protrudes beyond the upper surface position of the first coil portion in the thickness direction of the insulation substrate. That is, an end portion of the second magnetic portion in the thickness direction of the insulation substrate is away from the coil. For this reason, magnetic saturation caused by magnetic flux concentration is unlikely to occur in the end portion of the second magnetic portion, and thus direct current superimposition characteristics of the coil component are improved.

In the coil component according to the aspect of the present disclosure, the coil may have a second coil portion subjected to insulation coating with a second flat coil pattern formed around the penetration hole on the other surface of the insulation substrate.

In the coil component according to the aspect of the present disclosure, the second magnetic portion may further have a fourth part present in the same layer as the second coil portion.

In the coil component according to the aspect of the present disclosure, the second magnetic portion may further have a fifth part present on a side further away from the insulation substrate than an upper surface position of the second coil portion.

In the coil component according to the aspect of the present disclosure, the second magnetic portion may be constituted of a metal magnetic powder-containing resin containing metal magnetic powders including Fe.

The coil component according to the aspect of the present disclosure may further include an insulation coating layer covering an outer surface of the second magnetic portion.

In the coil component according to the aspect of the present disclosure, a distance from the outer surface of the magnetic body to the third part of the second magnetic portion may be longer than a length of a largest particle of the metal magnetic powders included in the metal magnetic powder-containing resin constituting the first magnetic portion.

DETAILED DESCRIPTION

Hereinafter, with reference to the accompanying drawings, an embodiment of the present disclosure will be described in detail. In the description, the same reference signs are used for the same elements or elements having the same function, and duplicate description will be omitted.

With reference to FIGS. 1 to 4, a structure of a coil component according to the embodiment will be described. For the sake of convenience of description, an XYZ coordinate system is set as shown in the diagrams. That is, a thickness direction of the coil component is set to a Z direction, a direction in which external terminal electrodes face each other is set to an X direction, and a direction orthogonal to the Z direction and the X direction is set to a Y direction.

Figure 1:
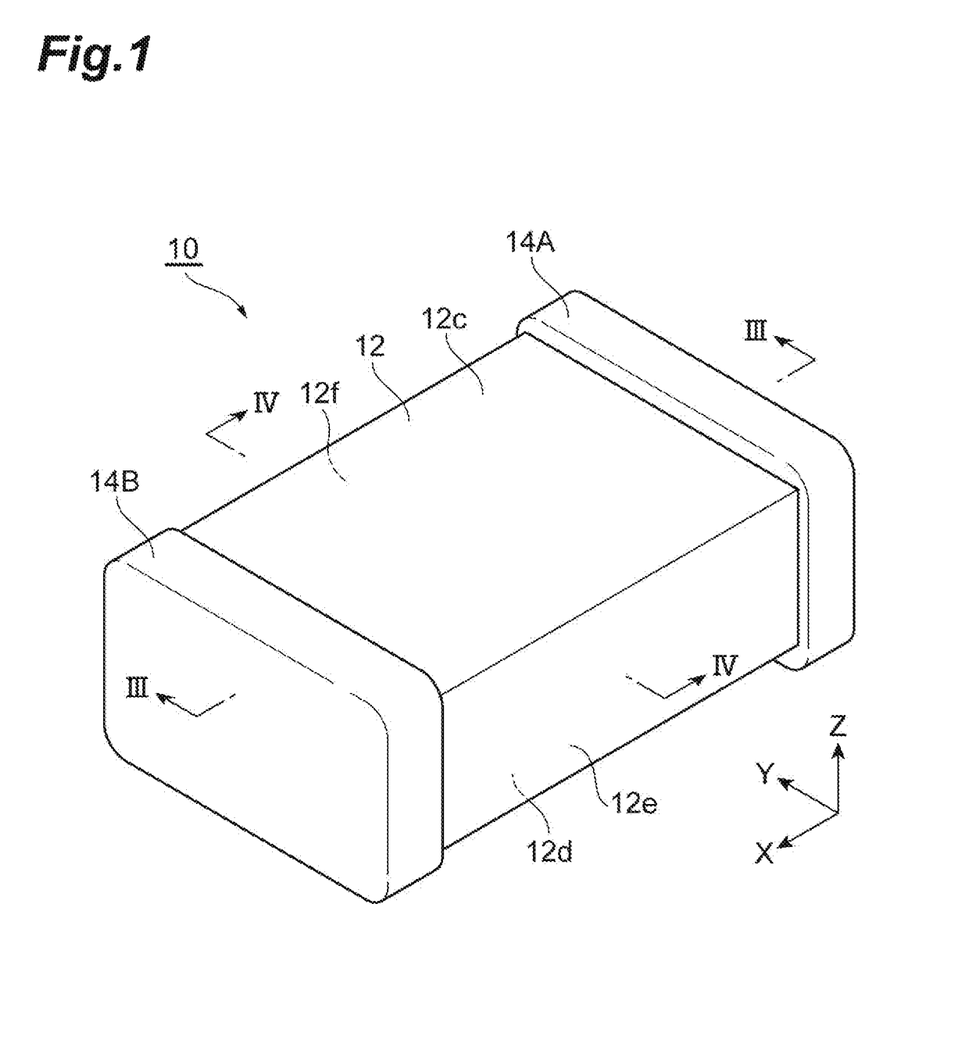
FIG. 1 is a schematic perspective view of a coil component according to an embodiment.

A coil component 10 is a flat coil element and is constituted of a main body portion 12 which exhibits a rectangular parallelepiped shape, and a pair of external terminal electrodes 14A and 14B which are provided on an outer surface of the main body portion 12. The main body portion 12 has a pair of end surfaces 12a and 12b which face each other in the X direction, a pair of main surfaces 12c and 12d which face each other in the Z direction, and a pair of side surfaces 12e and 12f which face each other in the Y direction. The pair of external terminal electrodes 14A and 14B are provided such that the whole surfaces of the pair of end surfaces 12a and 12b are covered. As an example, the coil component 10 is designed to have dimensions of a long side of 2.5 mm, a short side of 2.0 mm, and a height within a range of 0.8 to 1.0 mm.

The main body portion 12 is configured to include an insulation substrate 20, a coil C provided in the insulation substrate 20, and a magnetic body 26.

The insulation substrate 20 is a plate-shaped member constituted of a non-magnetic insulating material and has a substantially elliptical ring shape when viewed in the thickness direction thereof. An elliptical penetration hole 20c is provided in a central part of the insulation substrate 20. A substrate in which a glass cloth is impregnated with an epoxy-based resin and which has a plate thickness within a range of 10 μm to 60 μm can be used as the insulation substrate 20. Not only an epoxy-based resin but also a BT resin, polyimide, aramid, or the like can be used. Regarding a material for the insulation substrate 20, ceramic or glass can also be used. Regarding a material for the insulation substrate 20, a material for mass-produced printed boards may be adopted, or a resin material used for BT printed boards, FR4 printed boards, or FR5 printed boards may be adopted.

The coil C has a first coil portion 22A which is subjected to insulation coating with a first conductor pattern 23A for a flat air-core coil provided on one surface 20a (upper surface in FIG. 2) of the insulation substrate 20, a second coil portion 22B which is subjected to insulation coating with a second conductor pattern 23B for a flat air-core coil provided on the other surface 20b (lower surface in FIG. 2) of the insulation substrate 20, and a through-hole conductor 25 which connects the first conductor pattern 23A and the second conductor pattern 23B to each other.

Figure 2:
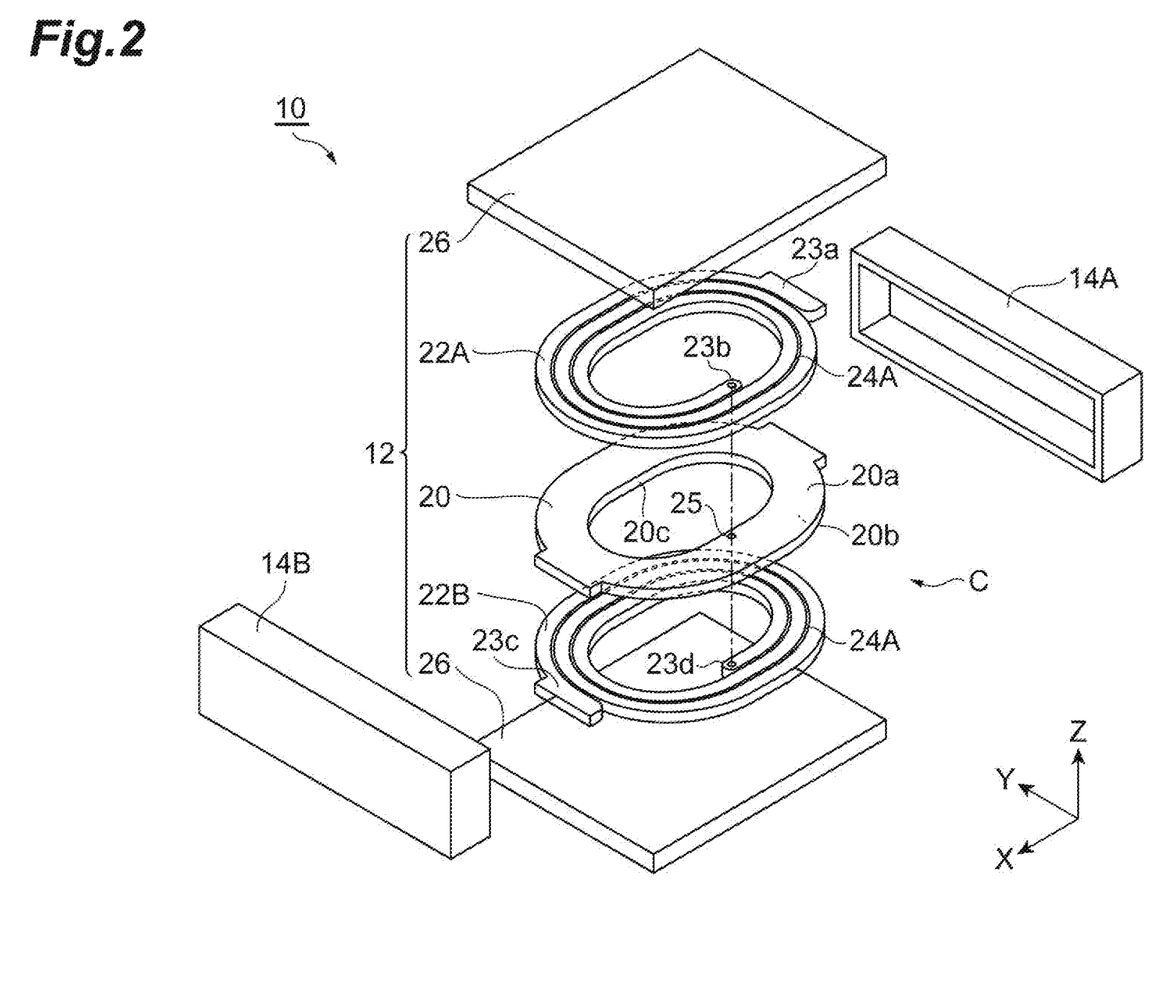
FIG. 2 is an exploded view of the coil component shown in FIG. 1.

The first conductor pattern 23A (first flat coil pattern) is a flat spiral pattern serving as a flat air-core coil and is formed through plating using a conductor material such as Cu. The first conductor pattern 23A is formed to be wound around the penetration hole 20c of the insulation substrate 20. More specifically, as shown in FIG. 2, the first conductor pattern 23A is wound in three clockwise turns toward the outward side when viewed in the upward direction (Z direction). The height of the first conductor pattern 23A (length in the thickness direction of the insulation substrate 20) is the same throughout the entire length.

An end portion 23a of the first conductor pattern 23A on the outward side is exposed on the end surface 12a of the main body portion 12 and is connected to the external terminal electrode 14A covering the end surface 12a. An end portion 23b of the first conductor pattern 23A on the inward side is connected to the through-hole conductor 25.

Similar to the first conductor pattern 23A, the second conductor pattern 23B (second flat coil pattern) is also a flat spiral pattern serving as a flat air-core coil and is formed through plating using a conductor material such as Cu. The second conductor pattern 23B is also formed to be wound around the penetration hole 20c of the insulation substrate 20. More specifically, the second conductor pattern 23B is wound in three counterclockwise turns toward the outward side when viewed in the upward direction (Z direction). That is, the second conductor pattern 23B is wound in a direction opposite to that of the first conductor pattern 23A when viewed in the upward direction. The height of the second conductor pattern 23B is the same throughout the entire length and can be designed to have the same height as that of the first conductor pattern 23A.

An end portion 23c of the second conductor pattern 23B on the outward side is exposed on the end surface 12b of the main body portion 12 and is connected to the external terminal electrode 14B covering the end surface 12b. An end portion 23d of the second conductor pattern 23B on the inward side is positionally aligned with the end portion 23b of the first conductor pattern 23A on the inward side in the thickness direction of the insulation substrate 20 and is connected to the through-hole conductor 25.

The through-hole conductor 25 is provided such that it penetrates an edge region of the penetration hole 20c of the insulation substrate 20 and connects the end portion 23b of the first conductor pattern 23A and the end portion 23d of the second conductor pattern 23B to each other. The through-hole conductor 25 can be constituted of a hole provided in the insulation substrate 20 and a conductive material (for example, a metal material such as Cu) filling the hole. The through-hole conductor 25 has a substantially columnar or a substantially prismatic external shape extending in the thickness direction of the insulation substrate 20.

Figure 3:
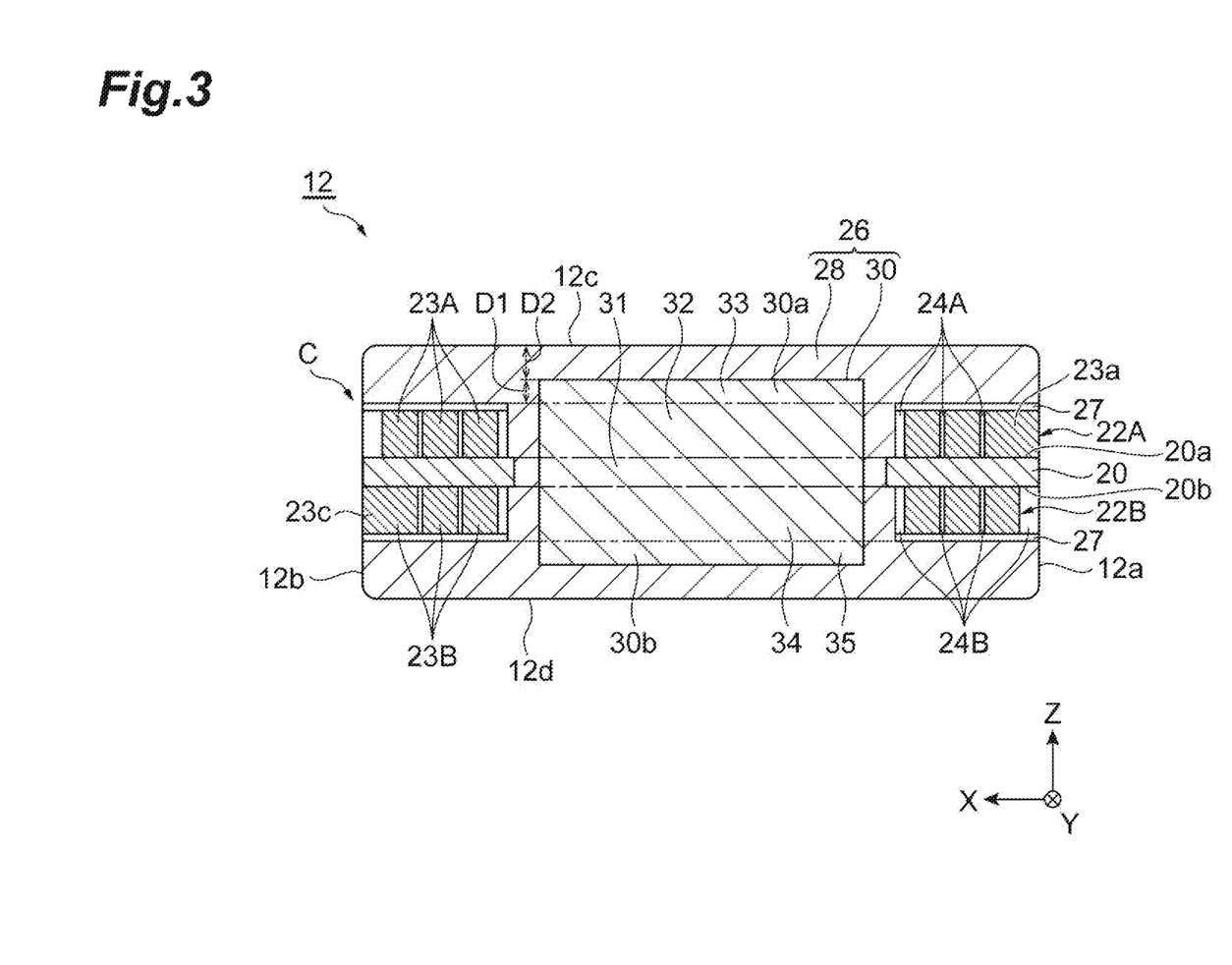
FIG. 3 is a cross-sectional view along line III-III in the coil component shown in FIG. 1.
Figure 4:
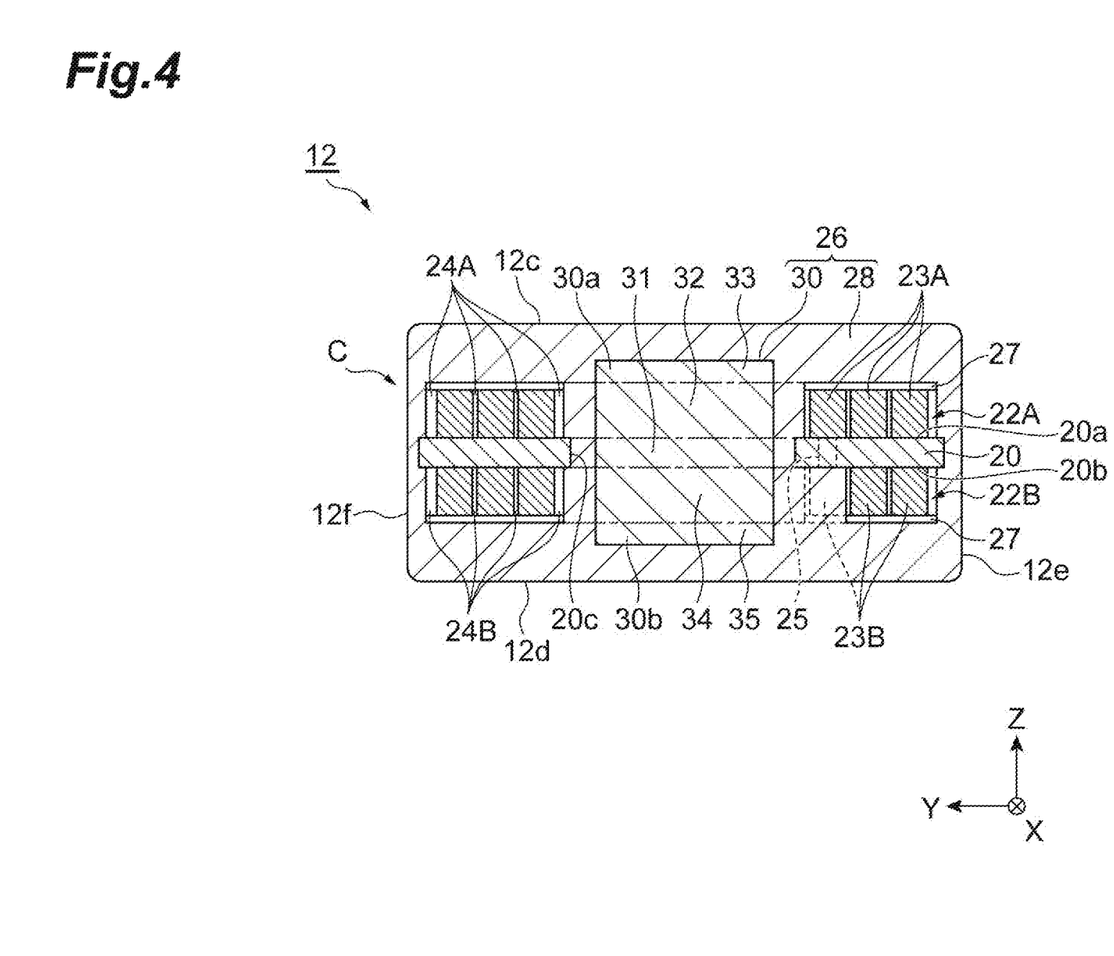
FIG. 4 is a cross-sectional view along line IV-IV in the coil component shown in FIG. 1.

In addition, as shown in FIGS. 3 and 4, the first coil portion 22A and the second coil portion 22B have resin walls 24A and 24B, respectively. The resin wall 24A of the first coil portion 22A is positioned between lines and on the inner circumference and the outer circumference of the first conductor pattern 23A. Similarly, the resin wall 24B of the second coil portion 22B is positioned between lines and on the inner circumference and the outer circumference of the second conductor pattern 23B. In the present embodiment, the resin walls 24A and 24B positioned on the inner circumferences and the outer circumferences of the conductor patterns 23A and 23B are designed to be thicker than the resin walls 24A and 24B positioned between lines of the conductor patterns 23A and 23B.

The resin walls 24A and 24B are constituted of an insulating resin material. The resin walls 24A and 24B can be provided on the insulation substrate 20 before the first conductor pattern 23A and the second conductor pattern 23B are formed. In this case, the first conductor pattern 23A and the second conductor pattern 23B are subjected to plating growth between walls defined by the resin walls 24A and 24B. The resin walls 24A and 24B can be provided on the insulation substrate 20 after the first conductor pattern 23A and the second conductor pattern 23B are formed. In this case, the resin walls 24A and 24B are provided in the first conductor pattern 23A and the second conductor pattern 23B through filling, painting, or the like.

The first coil portion 22A and the second coil portion 22B respectively have insulating layers 27 which integrally cover the first conductor pattern 23A, the second conductor pattern 23B, and the resin walls 24A and 24B from the upper surface side. The insulating layer 27 can be constituted of an insulating resin or an insulating magnetic material. The insulating layers 27 are interposed between the conductor pattern 23A of the first coil portion 22A and the conductor pattern 23B of the second coil portion 22B, and a first magnetic portion 28 of the magnetic body 26, thereby enhancing insulating properties between the conductor patterns 23A and 23B and the metal magnetic powders included in the first magnetic portion 28.

The magnetic body 26 integrally covers the insulation substrate 20 and the coil C. More specifically, the magnetic body 26 covers the insulation substrate 20 and the coil C in an up-down direction and covers the outer circumference of the insulation substrate 20 and the coil C. In addition, the magnetic body 26 fills the inside of the penetration hole 20c of the insulation substrate 20 and an inward region of the coil C.

As shown in FIGS. 3 and 4, the magnetic body 26 is configured to include the first magnetic portion 28 and a second magnetic portion 30.

The first magnetic portion 28 covers the first coil portion 22A provided on the one surface 20a of the insulation substrate and the second coil portion 22B provided on the other surface 20b. In addition, the first magnetic portion 28 covers the insulation substrate 20, the first coil portion 22A, and the second coil portion 22B from the inward side and the outward side.

The first magnetic portion 28 is constituted of a metal magnetic powder-containing resin. The metal magnetic powder-containing resin is a binding powdery substance in which a metal magnetic powdery substance is bound with a binder resin. The metal magnetic powders of the metal magnetic powder-containing resin constituting the first magnetic portion 28 are configured to include magnetic powders (for example, an iron-nickel alloy (permalloy alloy), carbonyl iron, amorphous, a non-crystalline or crystalline FeSiCr-based alloy, or Sendust) including at least Fe. For example, the binder resin is a thermosetting epoxy resin. In the present embodiment, a metal magnetic powdery substance content in the binding powdery substance is within a range of 80 to 92 vol % in percent by volume and is within a range of 95 to 99 wt % in percent by mass. From the viewpoint of magnetic characteristics, the metal magnetic powdery substance content in the binding powdery substance may be within a range of 85 to 92 vol % in percent by volume and may be within a range of 97 to 99 wt % in percent by mass. The magnetic powders of the metal magnetic powder-containing resin constituting the first magnetic portion 28 may be a powdery substance having an average particle size of one kind or may be a powder mix having an average particle size of a plurality of kinds. When the metal magnetic powders of the metal magnetic powder-containing resin constituting the first magnetic portion 28 are in a powder mix, the kinds or the Fe compositional proportions of the magnetic powders having different average particle sizes may be the same or may vary. As an example, in a case of a powder mix having average particle sizes of three kinds, the particle size of magnetic powders (large particle powders) having the largest average particle size can be within a range of 15 to 30 µm, the particle size of magnetic powders (small particle powders) having the smallest average particle size can be within a range of 0.3 to 1.5 µm, and magnetic powders (intermediate powders) having an average particle size between those of the large particle powders and the small particle powders can be within a range of 3 to 10 µm. 100 parts by weight of a powder mix may include large particle powders within a range of 60 to 80 parts by weight, intermediate particle powders within a range of 10 to 20 parts by weight, and small particle powders within a range of 10 to 20 parts by weight.

The average particle size of magnetic powders is stipulated by the particle size (d50, a so-called median size) at 50% of the integrated value in a particle size distribution and is obtained as follows. A scanning electron microscope (SEM) photograph of a cross section of the first magnetic portion 28 is captured. The captured SEM photograph is subjected to image processing using software, boundaries of magnetic powders are distinguished, and the area of the magnetic powders is calculated. The particle size is calculated by converting the calculated area of the magnetic powders into an equivalent circle diameter. For example, the particle sizes of 100 or more magnetic powders are calculated, and a particle size distribution of these magnetic powders is obtained. The particle size at 50% of the integrated value in the obtained particle size distribution is referred to as the average particle size d50. The particle shapes of the magnetic powders are not particularly limited.

The second magnetic portion 30 extends in the thickness direction (Z direction) of the insulation substrate 20 along a coil axis of the coil C in the inward region of the coil C. In the present embodiment, the second magnetic portion 30 has a substantially prismatic external shape extending in the thickness direction of the insulation substrate 20. The second magnetic portion 30 is housed in the penetration hole 20c of the insulation substrate 20 and on the inward side of the inward region of the coil C in a cross section (X-Y cross section) orthogonal to the thickness direction of the insulation substrate 20. In the present embodiment, the second magnetic portion 30 is positioned on a side further inward from the first magnetic portion 28 covering the insulation substrate 20, the first coil portion 22A, and the second coil portion 22B from the inward side. That is, the inside of the penetration hole 20c of the insulation substrate 20 and the inward region of the coil C are filled with the first magnetic portion 28 and the second magnetic portion 30.

The second magnetic portion 30 is constituted of a metal magnetic powder-containing resin. For example, a thermosetting epoxy resin can be used as a resin for a metal magnetic powder-containing resin constituting the second magnetic portion 30. The metal magnetic powders of the metal magnetic powder-containing resin constituting the second magnetic portion 30 are configured to include magnetic powders (for example, an iron-nickel alloy (permalloy alloy), carbonyl iron, amorphous, a non-crystalline or crystalline FeSiCr-based alloy, or Sendust) including at least Fe. The metal magnetic powders of the metal magnetic powder-containing resin constituting the second magnetic portion 30 may be a powdery substance having an average particle size of one kind or may be a powder mix having an average particle size of a plurality of kinds. When the metal magnetic powders of the metal magnetic powder-containing resin constituting the second magnetic portion 30 are in a powder mix, the kinds or the Fe compositional proportions of the magnetic powders having different average particle sizes may be the same or may vary. As an example, in a case of a powder mix having average particle sizes of three kinds, the particle size of magnetic powders (large particle powders) having the largest average particle size can be within a range of 15 to 30 μm, the particle size of magnetic powders (small particle powders) having the smallest average particle size can be within a range of 0.3 to 1.5 μm, and magnetic powders (intermediate powders) having an average particle size between those of the large particle powders and the small particle powders can be within a range of 3 to 10 μm. 100 parts by weight of a powder mix may include large particle powders within a range of 60 to 80 parts by weight, intermediate particle powders within a range of 10 to 20 parts by weight, and small particle powders within a range of 10 to 20 parts by weight.

The average particle size of magnetic powders is stipulated by the particle size (d50, a so-called median size) at 50% of the integrated value in a particle size distribution and is obtained as follows. An SEM photograph of a cross section of the second magnetic portion 30 is captured. The captured SEM photograph is subjected to image processing using software, boundaries of magnetic powders are distinguished, and the area of the magnetic powders is calculated. The particle size is calculated by converting the calculated area of the magnetic powders into an equivalent circle diameter. For example, the particle sizes of 100 or more magnetic powders are calculated, and a particle size distribution of these magnetic powders is obtained. The particle size at 50% of the integrated value in the obtained particle size distribution is referred to as the average particle size d50. The particle shapes of the magnetic powders are not particularly limited.

A metal magnetic powder-containing resin constituting the second magnetic portion 30 is designed to have a higher proportion (compositional proportion) of Fe than the metal magnetic powder-containing resin constituting the first magnetic portion 28. For this reason, the metal magnetic powder-containing resin constituting the second magnetic portion 30 has a higher saturation magnetic flux density (Bs) than the metal magnetic powder-containing resin constituting the first magnetic portion 28. For example, the saturation magnetic flux density of the second magnetic portion 30 may be as high as 1.5 times to 20 times the saturation magnetic flux density of the first magnetic portion 28. In this manner, since a second magnetic portion having a high saturation magnetic flux density extends in the thickness direction of the insulation substrate 20 in the inward region of the coil C, the magnetic flux of the coil C flows smoothly.

For example, the second magnetic portion 30 can be formed by a printing method or a dispenser method. That is, the second magnetic portion 30 can be formed by applying a kneaded paste of metal magnetic powders (material of the metal magnetic powder-containing resin) and a resin to a region, in which the second magnetic portion 30 is to be formed, through a printing method or a dispenser method, and curing the paste thereafter.

The second magnetic portion 30 need only be configured to have a higher proportion of Fe than that of the metal magnetic powder-containing resin constituting the first magnetic portion 28, is not necessarily limited to a metal magnetic powder-containing resin, and may be configured to include a structure (for example, a magnetic plate) constituted of a magnetic material. A structure constituted of a magnetic material can be disposed along the coil axis of the coil C.

The second magnetic portion 30 is configured to include a first part 31, a second part 32, a third part 33, a fourth part 34, and a fifth part 35 which are continuously arranged in the thickness direction of the insulation substrate 20.

The first part 31 is a part which is present in the same layer as the insulation substrate 20. The second part 32 is a part which is present in the same layer as the first coil portion 22A. The third part 33 is a part which is present on a side above (that is, a side away from the insulation substrate 20) the position of the upper surface of the first coil portion 22A. The fourth part 34 is a part which is present in the same layer as the second coil portion 22B. The fifth part 35 is a part which is present on a side below (that is, a side away from the insulation substrate 20) the position of the upper surface of the second coil portion 22B.

In the second magnetic portion 30, an upper end portion 30a constituted by the third part 33 protrudes upward from the first coil portion 22A of the coil C, and a lower end portion 30b constituted by the fifth part 35 protrudes downward from the coil C.

Therefore, the upper end portion 30a and the lower end portion 30b of the second magnetic portion 30 are further away from the coil C than when the third part 33 and the fifth part 35 are not present. For this reason, a magnetic flux is unlikely to be concentrated in the upper end portion 30a and the lower end portion 30b of the second magnetic portion 30, so that magnetic saturation is unlikely to occur. Therefore, improvement of direct current superimposition characteristics is realized in the coil component 10.

A protrusion length D1 of the third part 33 of the second magnetic portion 30 protruding upward from the first coil portion 22A is within a range of 10 to 200 μm. In addition, a distance D2 from the outer surface (that is, the main surface 12c) of the magnetic body 26 to the third part 33 is longer than the length of the largest particle of the metal magnetic powders included in the metal magnetic powder-containing resin constituting the first magnetic portion 28. For example, the distance D2 is within a range of 50 to 300 μm. The largest particle can be determined by performing image processing on a photograph of a cross section of the first magnetic portion 28 using software and distinguishing boundaries of the magnetic powders. For example, the longest magnetic particle can be determined as the largest particle after measuring the lengths of approximately 100 magnetic powders. The particle shapes of the magnetic powders are not particularly limited. In this case, a situation in which the outside of the magnetic body 26 and the second magnetic portion 30 are conducted via large magnetic powders included in the first magnetic portion 28 is effectively curbed. The distance D2 may be longer than the protrusion length D1, may be shorter than the protrusion length D1, or may be the same as the protrusion length D1.

The present disclosure is not limited to the embodiment described above, and various forms can be adopted.

Figure 5:
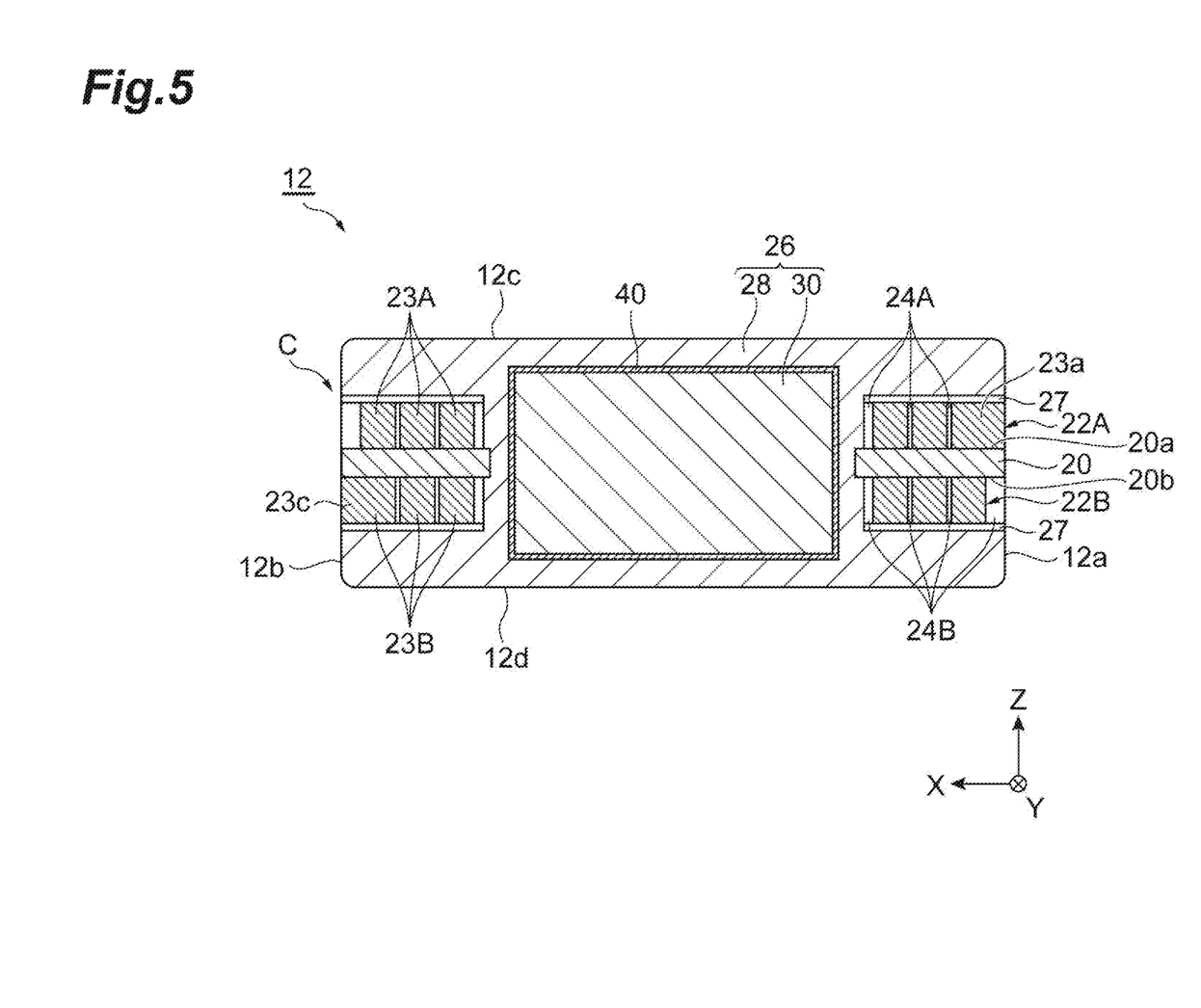
FIG. 5 is a cross-sectional view showing a coil component in a different form.

For example, in order to further enhance insulation between the second magnetic portion 30 and the first magnetic portion 28, insulation between the second magnetic portion 30 and the coil C, or insulation between the second magnetic portion 30 and the outside of the magnetic body 26, as shown in FIG. 5, the outer surface of the second magnetic portion 30 may be covered by an insulation coating layer 40. The insulation coating layer 40 can be constituted of a resin such as an epoxy resin, for example. The insulation coating layer 40 may cover the entire outer surface of the second magnetic portion 30 or may cover only a part thereof (for example, only an end surface in the thickness direction of the insulation substrate 20 or only a side surface facing the coil C).

Figure 6:
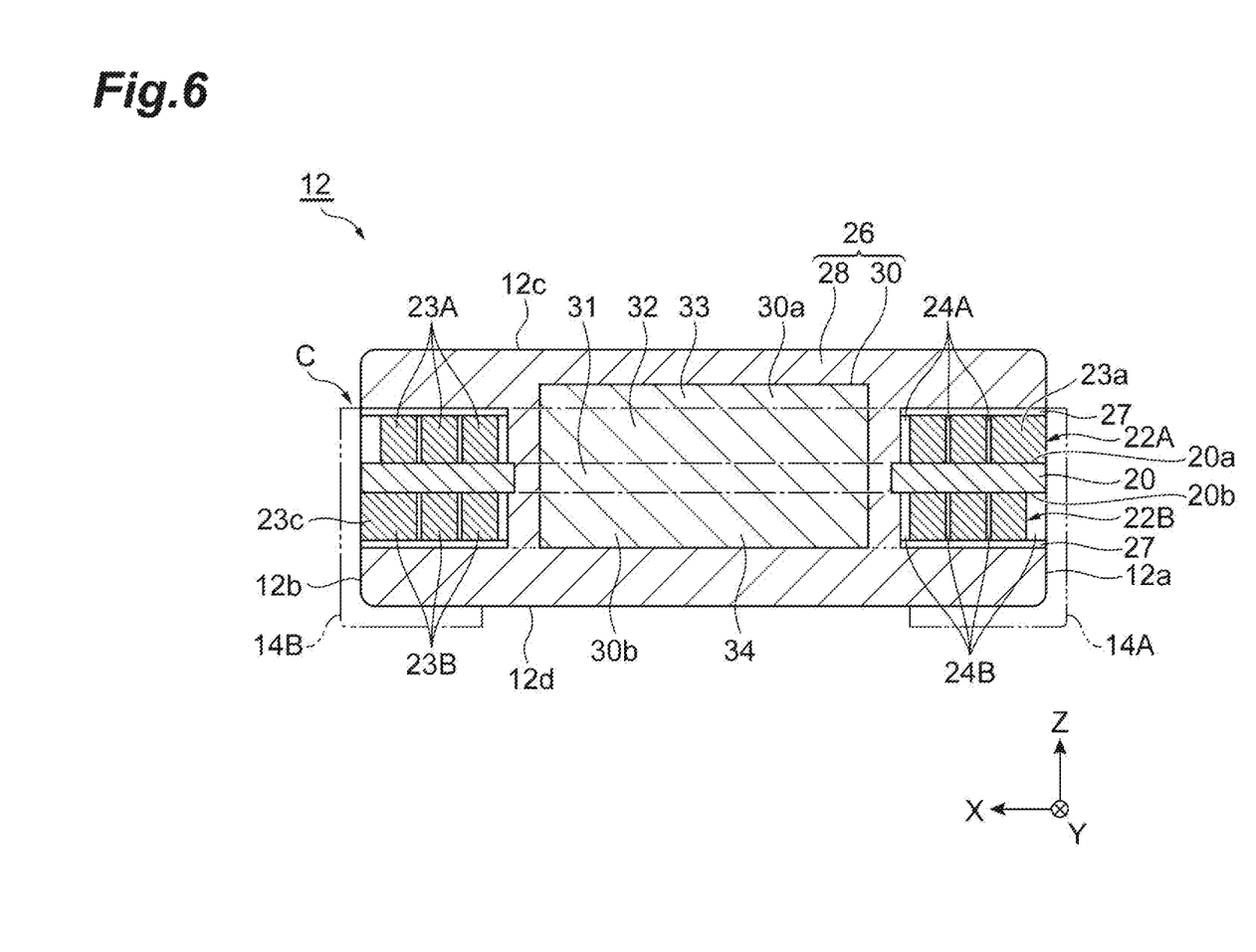
FIG. 6 is a cross-sectional view showing a coil component in a different form.

In addition, as shown in FIG. 6, the second magnetic portion 30 may have a form in which the lower end portion 30b does not protrude downward from the coil C. In the form shown in FIG. 6, the lower end portion 30b of the second magnetic portion 30 is constituted of the fourth part 34 and constitutes the same surface as the upper surface of the second coil portion 22B. As indicated by a two-dot dashed line in FIG. 6, in the external terminal electrodes 14A and 14B having an L-shaped cross section extending from the end surfaces 12a and 12b of the magnetic body 26 to the main surface 12d (bottom surface) on a lower side, if the distance to the lower end portion 30b of the second magnetic portion 30 is short, a short circuit may occur between the external terminal electrodes 14A and 14B and the second magnetic portion 30. The same applies to a case of a bottom surface terminal structure in which both end portions of the coil C are drawn out to the pair of external terminal electrodes provided on a bottom surface 12d. In such a case, due to a form in which the lower end portion 30b of the second magnetic portion 30 does not protrude downward from the coil C, a sufficient distance to the lower end portion 30b of the second magnetic portion 30 is ensured, and short-circuiting as described above is curbed.

Moreover, the external shape of the second magnetic portion 30 of the magnetic body 26 is not limited to a prismatic shape and may be a columnar shape, a polygonal shape, a spheroidal shape, or a prolate spheroidal shape. In addition, a form in which the first magnetic portion 28 is not present inside the penetration hole 20c of the insulation substrate 20 and in the inward region of the coil C, and the inside of the penetration hole 20c of the insulation substrate 20 and the inward region of the coil C are filled with only the second magnetic portion 30 may be adopted.

The coil C may adopt a form including both a first coil portion and a second coil portion or may adopt a form including only a first coil portion.

What is claimed is:

1. A coil component comprising:
   an insulation substrate provided with a penetration hole;
   a coil including a first coil portion subjected to insulation coating with a first flat coil pattern formed around the penetration hole on one surface of the insulation substrate;
   a magnetic body integrally covering the insulation substrate and the coil; and
   a pair of external terminal electrodes provided on an outer surface of the magnetic body and respectively connected to end portions of the coil,
   wherein the magnetic body includes:
      a first magnetic portion constituted of a metal magnetic powder-containing resin containing metal magnetic powders including Fe and covers opposite sides of the coil in at least a thickness direction of the insulation substrate, and
      a second magnetic portion extending in the thickness direction of the insulation substrate in an inward region of the coil and has a higher compositional proportion of Fe than the metal magnetic powder-containing resin constituting the first magnetic portion, and
   wherein:
      the second magnetic portion includes a first part present in the same layer as the insulation substrate, a second part present in the same layer as the first coil portion, and a third part present on a side further away from the insulation substrate than an upper surface position of the first coil portion,
      the first magnetic portion includes a first outer surface that is disposed on a side of the third part of the second magnetic portion in the thickness direction, and
      a distance from the first outer surface of the first magnetic portion to the third part of the second magnetic portion in the thickness direction is longer than a length of a largest particle of the metal magnetic powders included in the metal magnetic powder-containing resin constituting the first magnetic portion.

2. The coil component according to claim 1, wherein the coil further includes a second coil portion subjected to insulation coating with a second flat coil pattern formed around the penetration hole on the other surface of the insulation substrate.

3. The coil component according to claim 2, wherein the second magnetic portion further includes a fourth part present in the same layer as the second coil portion.

4. The coil component according to claim 3, wherein the second magnetic portion further includes a fifth part present on a side further away from the insulation substrate than an upper surface position of the second coil portion.

5. The coil component according to claim 1, wherein the second magnetic portion is constituted of a metal magnetic powder-containing resin containing metal magnetic powders including Fe.

6. The coil component according to claim 1 further comprising:
   an insulation coating layer covering an outer surface of the second magnetic portion.

* * * * *